United States Patent
Onuma et al.

(10) Patent No.: US 10,457,176 B2
(45) Date of Patent: Oct. 29, 2019

(54) CONVEYANCE SEAT

(71) Applicants: TS TECH CO., LTD., Asaka-shi, Saitama (JP); HONDA MOTOR CO., LTD., Tokyo (JP)

(72) Inventors: Koji Onuma, Tochigi (JP); Ryuhei Abe, Tochigi (JP); Taiji Misono, Saitama (JP); Toshimitsu Mizukoshi, Saitama (JP); Masaki Shimazu, Saitama (JP); Akira Nakajima, Saitama (JP); Yuki Fukuda, Saitama (JP); Hiromitsu Nagatomo, Saitama (JP)

(73) Assignees: TS Tech Co., Ltd., Saitama (JP); Honda Motor Co., Ltd., Tokyo (JP)

( * ) Notice: Subject to any disclaimer, the term of this patent is extended or adjusted under 35 U.S.C. 154(b) by 45 days.

(21) Appl. No.: 15/793,467

(22) Filed: Oct. 25, 2017

(65) Prior Publication Data
US 2018/0118068 A1    May 3, 2018

(30) Foreign Application Priority Data

Oct. 28, 2016 (JP) ................. 2016-212022

(51) Int. Cl.
*B60N 2/68* (2006.01)
*B60N 2/70* (2006.01)
*B60N 2/72* (2006.01)

(52) U.S. Cl.
CPC ............ *B60N 2/7094* (2013.01); *B60N 2/68* (2013.01); *B60N 2/7052* (2013.01); *B60N 2/72* (2013.01)

(58) Field of Classification Search
CPC .. B60N 2/7094; B60N 2/7052; B60N 2/7047; B60N 2/7035; B60N 2/7058; B60N 2/70; B60N 2/68; B60N 2/72

(Continued)

(56) References Cited

U.S. PATENT DOCUMENTS 9,050,919 B2 * 6/2015 Matsumoto .......... B60N 2/7094
9,090,186 B2 * 7/2015 Wiegelmann ............ B60N 2/54
(Continued)

FOREIGN PATENT DOCUMENTS

DE   10 2011 054 960 A1   5/2013
EP        1 593 547 A1   11/2005
(Continued)

OTHER PUBLICATIONS

Extended European Search Report issued in related application EP 17198920.5, dated Mar. 2, 2018, 7 pages.
(Continued)

*Primary Examiner* — Mark R Wendell
(74) *Attorney, Agent, or Firm* — Drinker Biddle & Reath LLP (57) ABSTRACT

Provided is a conveyance seat configured for adjustment of a deflection amount of a seat forming the conveyance seat, i.e., cushion properties of the seat. The conveyance seat includes a seat frame and a buffering body bridged over the seat frame configured to elastically support a seated occupant. The buffering body has a wire having both end portions attached to the seat frame, and a back restriction member configured to support at least a portion of the wire to restrict deflection of the portion of the wire. The wire includes a first right-to-left extending portion and a second right-to-left extending portion that extend in a seat right-to-left direction, and a coupling portion coupling the first right-to-left extending portion and the second right-to-left extending portion. The back restriction member is made of a resin material, and supports the first right-to-left extending portion and the second right-to-left extending portion.

7 Claims, 8 Drawing Sheets

(58) Field of Classification Search
USPC ............ 297/452.54, 452.52, 452.48, 452.49
See application file for complete search history.

(56) References Cited

U.S. PATENT DOCUMENTS

| | | | | |
|---|---|---|---|---|
| 9,950,650 | B1* | 4/2018 | Watanabe | B60N 2/2893 |
| 2006/0131939 | A1* | 6/2006 | Kamei | B60N 2/42709 |
| | | | | 297/311 |
| 2009/0152931 | A1* | 6/2009 | Sahashi | B60N 2/72 |
| | | | | 297/452.49 |
| 2013/0119715 | A1* | 5/2013 | Medoro | B60N 2/686 |
| | | | | 297/180.1 |
| 2013/0313876 | A1* | 11/2013 | Perrin | B60N 2/24 |
| | | | | 297/344.13 |
| 2015/0232008 | A1* | 8/2015 | Zimmerbeutel | B60N 2/682 |
| | | | | 297/452.11 |
| 2015/0306998 | A1* | 10/2015 | Matsui | B60N 2/68 |
| | | | | 297/452.52 |
| 2015/0343932 | A1 | 12/2015 | Hosoe | |
| 2017/0120789 | A1* | 5/2017 | Kijima | B60N 2/72 |
| 2017/0210262 | A1* | 7/2017 | Line | B60N 2/7094 |
| 2018/0118067 | A1* | 5/2018 | Line | B60N 2/58 |
| 2018/0208087 | A1* | 7/2018 | Baba | B60N 2/68 |
| 2018/0251050 | A1* | 9/2018 | Damerow | B60N 2/224 |
| 2018/0272906 | A1* | 9/2018 | Onuma | B60N 2/68 |
| 2018/0272969 | A1* | 9/2018 | Onuma | B60N 2/002 |
| 2018/0290569 | A1* | 10/2018 | Kijima | B60N 2/68 |

FOREIGN PATENT DOCUMENTS

| | | |
|---|---|---|
| JP | S63-153871 U | 10/1988 |
| JP | 2007-313045 A | 12/2007 |
| JP | 2010-125122 | 6/2010 |
| JP | 2010-259685 A | 11/2010 |
| JP | 2013-100107 | 5/2013 |
| JP | 2015-227144 A | 12/2015 |
| JP | 2016-144987 A | 8/2016 |

OTHER PUBLICATIONS

Office Action issued in related application JP 2016-212022, dated May 15, 2018, with machine generated English language translation, 7 pages.

* cited by examiner

FRONT ←——→ BACK

CONVEYANCE SEAT

CROSS REFERENCE TO RELATED APPLICATIONS

This application is based upon and claims the priority benefit of Japanese Patent Application No. JP 2016-212022, filed Oct. 28, 2016, the contents being incorporated herein by reference.

BACKGROUND

The present disclosure relates to a conveyance seat, and specifically relates to a conveyance seat capable of adjusting cushion properties.

For attenuating impact due to oscillation of a conveyance upon operation thereof, a seat used for the conveyance generally includes a buffering body formed of, e.g., a linear wire attached to bridge over a seat frame. Regarding the buffering body, Japanese Patent Publication JP 2013-100107A discloses a buffering body including wires for a conveyance seat and a resin member coupling the wires. The resin member forming the buffering body has a role to restrict approaching/separation between the wires to stabilize buffering performance of the buffering body. The resin member of JP 2013-100107 includes a bent portion allowing elastic deformation, and therefore, durability of the buffering body is enhanced.

SUMMARY

A deflection amount of the buffering body described herein varies according to the materials and volumes of the wires and the resin member and the size of the seat frame over which the buffering body is attached and bridged. However, in the buffering body described in JP 2013-100107, such a variable deflection amount of the buffering body cannot be easily adjusted. That is, cushion properties of the conveyance seat cannot be easily adjusted.

The present disclosure has been made in view of the above-described problem, and various embodiments described herein provide a conveyance seat configured for easy adjustment of a deflection amount of a seat forming the conveyance seat, i.e., cushion properties of the seat.

According to an embodiment of the conveyance seat of the present disclosure, the above-described problem is solved by a conveyance seat including a seat frame and a buffering body bridged over the seat frame to elastically support a seated occupant. The buffering body has a linear member having both end portions attached to the seat frame, and a restriction member configured to support at least a portion of the linear member to restrict deflection of the portion of the linear member. The linear member includes first and second extending portions extending in a seat right-to-left direction, and a coupling portion coupling the first and second extending portions. The restriction member is made of a resin material, and supports the first and second extending portions. According to the above-described configuration, the restriction member made of the resin material supports the first and second extending portions of the linear member, and restrict deflection of these portions. A deflection amount of the linear member can be easily adjusted in such a manner that the restriction member is, as necessary, cut off to eliminate restriction on deflection of the linear member. That is, cushion properties of the conveyance seat can be easily adjusted.

The restriction member supports the first and second extending portions and the coupling portion, in an embodiment. According to the above-described configuration, the restriction member supports the first and second extending portions and the coupling portion, and therefore, deflection of the linear member can be more tightly restricted.

The linear member includes a plurality of first extending portions, a plurality of second extending portions, and a plurality of coupling portions, and the restriction member supports the first extending portions and the second extending portions, or supports the first extending portions, the second extending portions, and the coupling portions, in an embodiment. According to the above-described configuration, the linear member includes the first extending portions, the second extending portions, and the coupling portions, these portions being targeted for deflection amount restriction by the restriction member. Thus, the deflection amount of the linear member can be more finely adjusted.

The first and second extending portions are arranged at different heights relative to each other, in an embodiment. According to the above-described configuration, the first and second extending portions are arranged at the different heights. Even with a narrow space in a seat front-to-back direction, a portion of the restriction member supporting the first and second extending portions is cut off so that the buffering body capable of adjusting the deflection amount of the linear member can be disposed.

The linear member includes a plurality of linear members arranged in parallel, the restriction member includes a plurality of restriction members provided to support some of the arranged linear members, and at least some of the restriction members are integrally formed, in an embodiment. According to the above-described configuration, at least some of the restriction members supporting some of the linear members arranged in parallel are integrally formed, and therefore, deformation of the linear members can be tightly restricted.

The restriction member is provided with a cutout, in an embodiment. According to the above-described configuration, the restriction member has the cutout, and therefore, the restriction member can be easily cut off.

According to the present disclosure, the restriction member is, as necessary, cut off to eliminate restriction on deflection of the linear member, in an embodiment. In this manner, the deflection amount of the linear member can be adjusted, and the cushion properties of the conveyance seat can be adjusted. Moreover, according to the present disclosure, deflection of the linear member can be more tightly restricted. Further, according to the present disclosure, the deflection amount of the linear member can be more finely adjusted. In addition, according to the present disclosure, the buffering body configured to adjust the deflection amount of the linear member can be disposed even with the narrow space in the seat front-to-back direction. Moreover, according to the present disclosure, deformation of the linear member can be tightly restricted. Further, according to the present disclosure, the restriction member can be easily cut off.

BRIEF DESCRIPTION OF THE DRAWINGS

Various embodiments of the invention are illustrated in the drawings, in which.

DETAILED DESCRIPTION

One embodiment (the present embodiment) of the present disclosure is described below with reference to the drawings. Note that the embodiment described below is set forth merely as an example for the sake of easy understanding of the present disclosure, and is not intended to limit the present disclosure. That is, changes and modifications can be made to the present disclosure without departing from the gist of the present disclosure, and equivalents thereof are also within the scope of the present disclosure.

Moreover, a vehicle seat is described below as an example of a conveyance seat of the present embodiment. Note that the present disclosure is also applicable to conveyances other than vehicles, and for example, is applicable to ships, airplanes, industrial machines, etc.

Note that in the description below, "right and left" mean a right-to-left direction when an occupant faces a front side on the conveyance seat, and the right-to-left direction (a seat right-to-left direction) is also referred to as a "seat width direction." Moreover, a "front-to-back direction" means a front-to-back direction when the occupant is seated on the conveyance seat.

Vehicle Seat S and Seat Frame Sa

Figure 1:
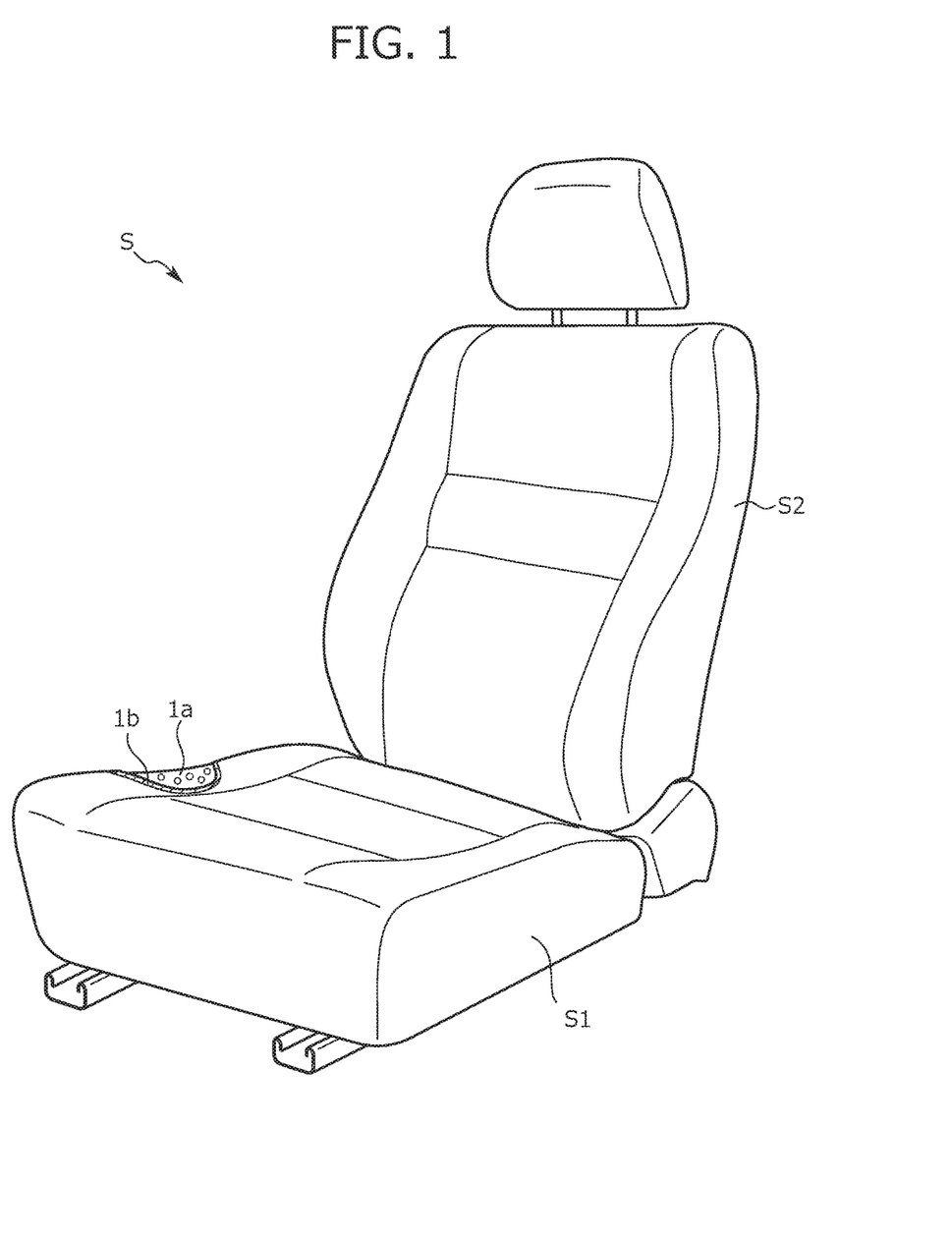
FIG. 1 is a perspective view of a vehicle seat of one embodiment of the present disclosure.
Figure 2:
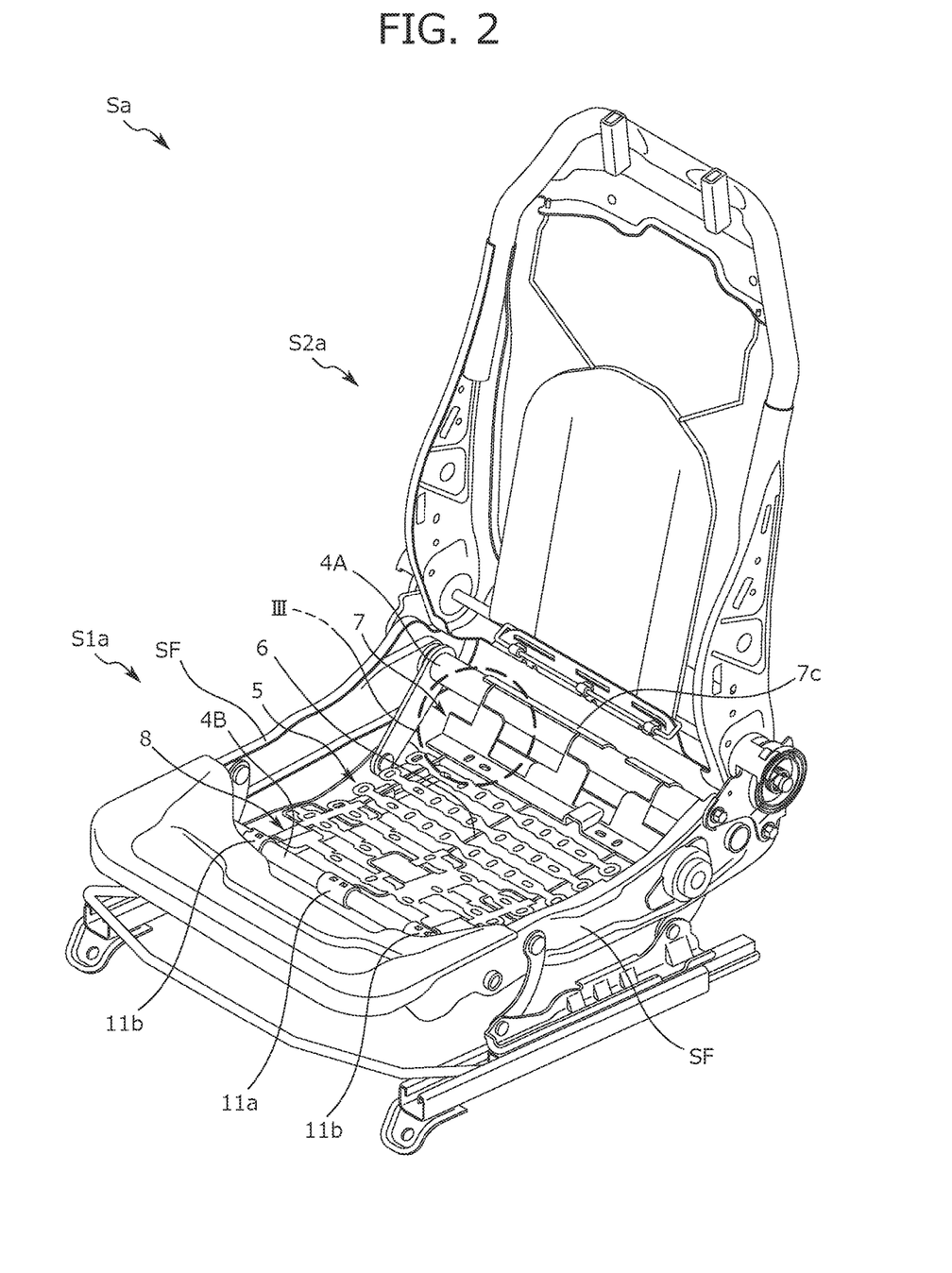
FIG. 2 is a perspective schematic view of a seat frame, according to an embodiment.

First, a vehicle seat S and a seat frame Sa of the present embodiment is outlined with reference to FIGS. 1 and 2. Note that FIG. 1 is a perspective view of the vehicle seat S of the present embodiment, and FIG. 2 is a perspective view of the seat frame Sa. The vehicle seat S mainly includes a seat cushion S1 as a seating portion, and a seat back S2 as a backrest.

The seat cushion S1 includes a cushion frame S1a illustrated in FIG. 2, a cushion pad 1a placed on the cushion frame S1a, and a skin 1b covering the cushion pad 1a and fixed to the cushion frame S1a. The seat back S2 is attached to a back end portion of the seat cushion S1, and includes a back frame S2a illustrated in FIG. 2. The cushion frame S1a and the back frame S2a form the seat frame Sa.

Cushion Frame S1a

The cushion frame S1a mainly includes right and left side frames SF extending in the front-to-back direction, a back coupling pipe 4A coupling the back end sides of the right and left side frames SF, and a front coupling pipe 4B coupling the front end sides of the right and left side frames SF. A buffering body 5 is attached to bridge between the back coupling pipe 4A and the front coupling pipe 4B forming the cushion frame S1a. The buffering body 5 of the present embodiment is configured to elastically support the occupant on the vehicle seat S. The buffering body 5 mainly includes three wires 6 as linear members arranged right to left and extending mainly in the front-to-back direction, and a back restriction member 7 and a front restriction member 8 molded from resin integrally with the wires 6.

The three wires 6 are members configured to provide elasticity to the buffering body 5, and as described below, partially have portions extending in the right-to-left direction. Both end portions of each of the three wires 6 are attached to the seat frame Sa. Specifically, a front end portion of each of the three wires 6 is attached to the front coupling pipe 4B by an attachment member 11a, 11b made of resin. A back end portion of each of the three wires 6 is hooked on the back coupling pipe 4A by a lock plate 7c, as a portion of the back restriction member 7, made of resin. Moreover, in the present embodiment, a right two of the three wires 6 are formed in the same shape, and a left one of the three wires 6 is formed in a shape symmetrical to that of the right two wires 6 in the right-to-left direction. Note that the number of wires 6 can be optionally set.

Figure 5:
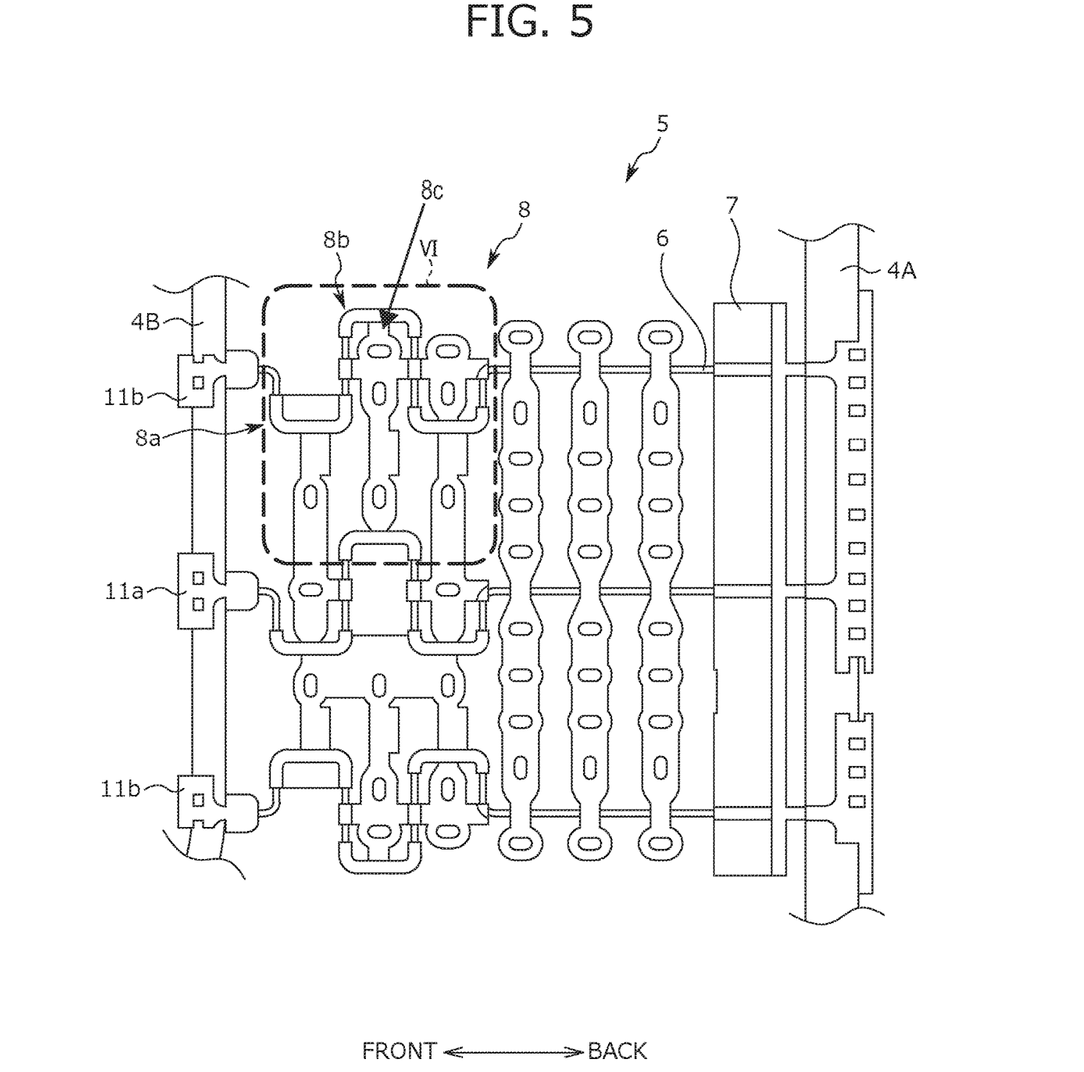
FIG. 5 is a top, schematic view of wires, the back restriction member, and a front restriction member forming a buffering body, according to an embodiment.

The shapes of the wires 6 are preferably symmetrical to each other in the right-to-left direction because elasticity is equal between the right and left wires 6. However, in the case of an odd number of wires 6 as in the present embodiment, the middle wire 6 is preferably formed in the same shape as that of either one of the right and left wires 6. This is because the middle wire 6 is, as compared to the wires 6 at right and left end portions, less susceptible to influence relating to equal elasticity in the right-to-left direction. Note that as illustrated in FIG. 5, the wires 6 are arranged in parallel. In other words, the wires 6 are arranged in parallel with each other.

Back-End-Side Shape of Wire 6 and Shape of Back Restriction Member 7

Figure 3:
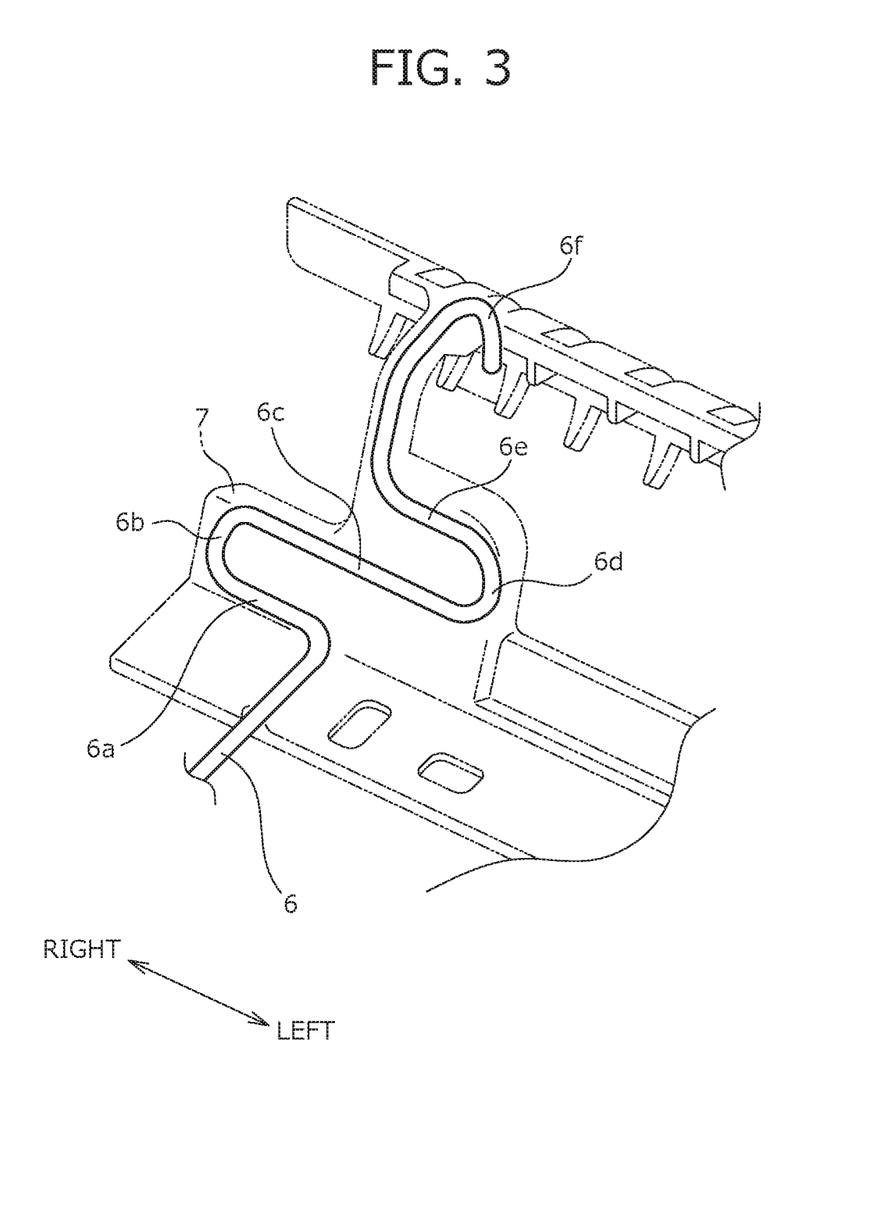
FIG. 3 is a perspective view of a wire embedded in a back restriction member, according to an embodiment.
Figure 4:
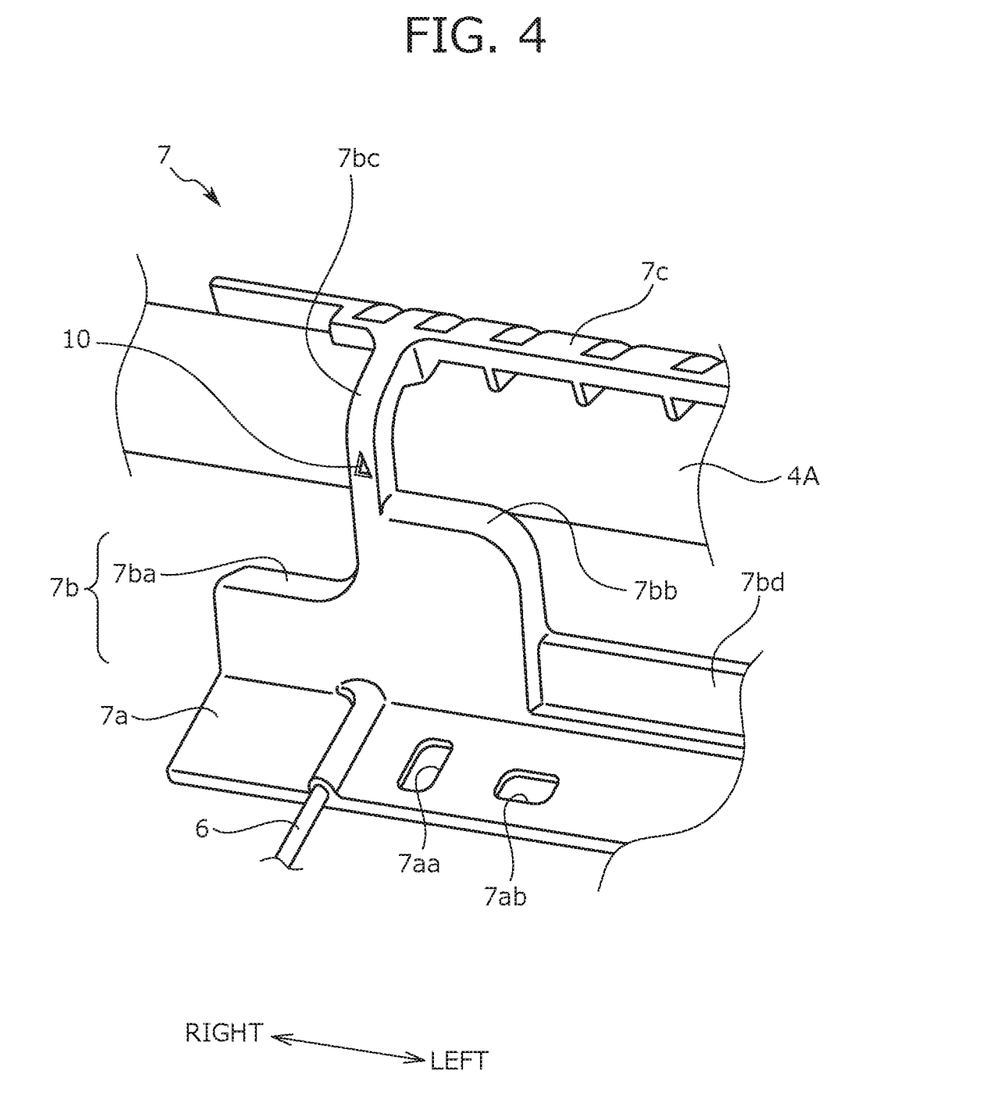
FIG. 4 is a perspective view of the back restriction member, according to an embodiment.

The back-end-side shape of the wire 6 and the shape of the back restriction member 7 is, in addition to FIG. 2, described with reference to FIGS. 3 and 4. Note that FIG. 3 is a perspective view of the wire 6 embedded in the back restriction member 7, and FIG. 4 is a perspective view of the back restriction member 7. The functions of the back end side of the wire 6 and the back restriction member 7 is described in detail below.

The back end side of one of the three wires 6 disposed on the right side is described with reference to FIG. 3. Starting from a portion bent to the right direction after extending backward, the wire 6 is, on the back end side, formed continuous to a right-to-left extending portion 6a, a coupling portion 6b, a right-to-left extending portion 6c, a coupling portion 6d, a right-to-left extending portion 6e, and a hook portion 6f. Note that any adjacent two of the right-to-left extending portions 6a, 6c, 6e form a portion corresponding to a first extending portion or a second extending portion of the present disclosure.

Starting from the portion bent to the right direction after extending backward, the right-to-left extending portion 6a is, on the back end side of the wire 6, formed to extend in the right-to-left direction. The right-to-left extending portions 6c, 6e are also formed to extend in the right-to-left direction as in the right-to-left extending portion 6a, and the right-to-left extending portions 6a, 6c, 6e are arranged in this order from bottom up. Specifically, the right-to-left extending portion 6a and the right-to-left extending portion 6e are formed to have a substantially same length, and the right-to-left extending portion 6c is formed longer than the right-to-left extending portions 6a, 6e.

The coupling portion 6b is formed in a U-shape to smoothly couple right end portions of the right-to-left extending portion 6a and the right-to-left extending portion 6c. Similarly, the coupling portion 6d is formed in a U-shape to smoothly couple left end portions of the right-to-left extending portion 6c and the right-to-left extending portion 6e. Of the wire 6, a portion continuously forming the right-to-left extending portion 6a, the coupling portion 6b, the right-to-left extending portion 6c, the coupling portion 6d, and the right-to-left extending portion 6e is, in other words, formed in a substantially S-shape. Since the wire 6 is formed as described above, an extension amount in the upper-to-lower direction increases when a predetermined portion of the back restriction member 7 is removed. Such a function is described in detail below.

After a portion extending to the right of the right-to-left extending portion 6e to bend to the upward direction, the hook portion 6f is formed to bend in an inverted U-shape from the front side to the back side. By elastic force of the hook portion 6f, a back end portion of the buffering body 5 is locked at the back coupling pipe 4A.

The back restriction member 7 and the front restriction member 8 described below are made of a resin material, and are molded integrally with the wires 6 by injection molding. Moreover, as illustrated in FIG. 4, the back restriction member 7 mainly includes, a plate-shaped horizontally-extending plate 7a disposed substantially horizontal to extend in the right-to-left direction, a vertically-extending plate 7b formed to stand upwardly from a back end portion of the horizontally-extending plate 7a, and the lock plate 7c locked at the back coupling pipe 4A.

The horizontally-extending plate 7a extends in the right-to-left direction as described above, and couples back end portions of front-to-back portions of the three wires 6. Moreover, the horizontally-extending plate 7a has harness insertion holes 7aa, 7ab penetrating the horizontally-extending plate 7a in a thickness direction thereof.

The vertically-extending plate 7b is formed to extend upward from the back end portion of the horizontally-extending plate 7a, and is disposed in a substantially vertical direction. Specifically, the vertically-extending plate 7b includes a lower restriction portion 7ba covering and supporting a connection portion between the coupling portion 6b and the right-to-left extending portion 6c of the wire 6, an upper restriction portion 7bb covering and supporting a connection portion between the coupling portion 6d and the right-to-left extending portion 6e, a hook-side restriction portion 7bc formed along the hook portion 6f, and a connection portion 7bd. Note that the hook-side restriction portion 7bc has a triangular cutout 10, described below.

The lower restriction portion 7ba, the upper restriction portion 7bb, and the hook-side restriction portion 7bc are formed along the S-shape of the back end side of each of the three wires 6. The connection portion 7bd is formed integrally with a portion forming the horizontally-extending plate 7a, the lower restriction portion 7ba, and the upper restriction portion 7bb such that the back end sides of the three wires 6 are connected together. Note that the connection portion 7bd stands substantially vertical and extends in the right-to-left direction, and is formed to have a thickness smaller than those of the lower restriction portion 7ba and the upper restriction portion 7bb. As described above, the connection portion 7bd is formed integrally with the portion forming the lower restriction portion 7ba and the upper restriction portion 7bb, and therefore, deformation of the wires 6 can be tightly restricted.

The lock plate 7c has a locking function at the back coupling pipe 4A and is formed continuous to the hook-side restriction portion 7bc, and detailed description thereof will not be made. The lock plate 7c is formed with a cross section bent in a quarter round arc shape, and is formed to extend in the right-to-left direction.

Front-End-Side Shape of Wire 6 and Shape of Front Restriction Member 8

Figure 6:
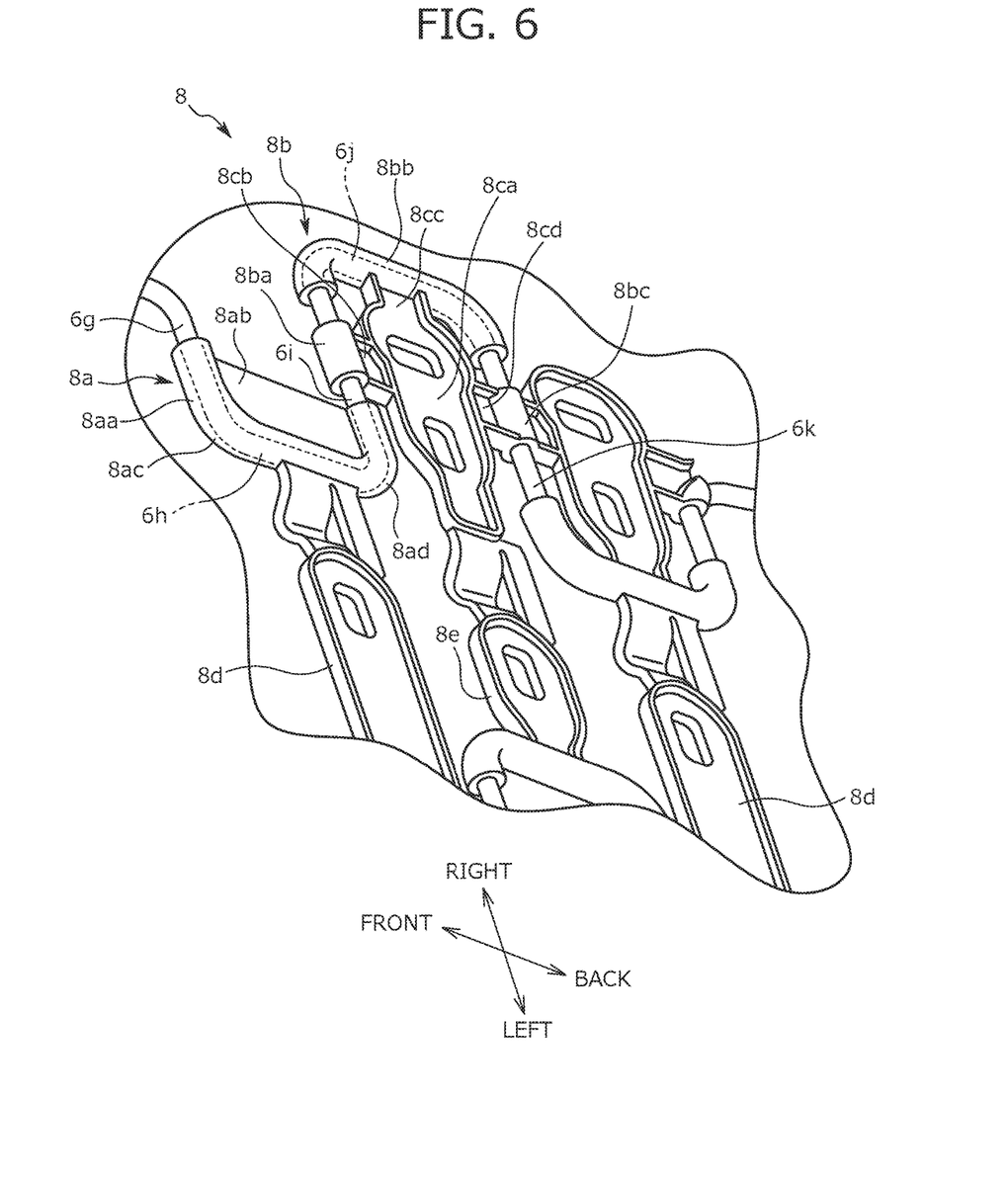
FIG. 6 is an enlarged, perspective view of a VI portion of the front restriction member of FIG. 5, according to an embodiment.

Next, the front-end-side shape of the wire 6 and the shape of the front restriction member 8 is described with reference to FIGS. 5 and 6. Note that FIG. 5 is a plan view of the wires 6, the back restriction member 7, and the front restriction member 8 forming the buffering body 5, FIG. 6 is an enlarged perspective view of a VI portion of the front restriction member 8 of FIG. 5. Moreover, the functions of the front end side of the wire 6 and the front restriction member 8 is described in detail below.

As illustrated in FIGS. 5 and 6, starting from a portion bent to the left direction after extending backward from an end portion attached to the attachment member 11b, one of the three wires 6 disposed on the right side is, on the front end side, formed continuous to a right-to-left extending portion 6g, a coupling portion 6h, a right-to-left extending portion 6i, a coupling portion 6j, and a right-to-left extending portion 6k. Note that any adjacent two of the right-to-left extending portions 6g, 6i, 6k form a portion corresponding to the first extending portion or the second extending portion of the present disclosure.

Starting from the portion bent to the left direction after extending backward on the front end side of the wire 6, the right-to-left extending portion 6g is formed to extend in the right-to-left direction. Then, as in the right-to-left extending portion 6g, the right-to-left extending portions 6i, 6k are also formed to extend in the right-to-left direction, and the right-to-left extending portions 6g, 6i, 6k are arranged in this order from front to back. Specifically, the right-to-left extending portion 6i and the right-to-left extending portion 6k are formed to have the substantially same length, and the right-to-left extending portion 6g is formed shorter than the right-to-left extending portions 6i, 6k.

The coupling portion 6h is formed in a U-shape to smoothly couple left end portions of the right-to-left extending portion 6g and the right-to-left extending portion 6i. Similarly, the coupling portion 6j is formed in a U-shape to smoothly couple right end portions of the right-to-left extending portion 6i and the right-to-left extending portion 6k. Of the wire 6, a portion continuously forming the right-to-left extending portion 6g, the coupling portion 6h, the right-to-left extending portion 6i, the coupling portion 6j, and the right-to-left extending portion 6k is, in other words, formed in a substantially S-shape. Since the wire 6 is formed as described above, an extension amount in the front-to-back direction increases when a predetermined portion of the front restriction member 8 is removed. Such a function is described in detail below.

The front restriction member 8 is disposed substantially horizontally. As illustrated in FIG. 6, the front restriction member 8 includes a first restriction portion 8a covering and supporting a connection portion among the right-to-left extending portion 6g, the coupling portion 6h, and the right-to-left extending portion 6*i*, a second restriction portion 8*b* coupling and supporting the right-to-left extending portion 6*i* and the right-to-left extending portion 6*k*, and bridging portions 8*d*, 8*e* coupling the front restriction members 8 formed with the three right and left wires 6. Specifically, the first restriction portion 8*a* includes a bent extending portion 8*aa* formed in a substantially U-shape along the left end side of the right-to-left extending portion 6*g*, the coupling portion 6*h*, and the left end side of the right-to-left extending portion 6*i*, and a plate portion 8*ab* formed continuous to the bent extending portion 8*aa* in a portion surrounded by the U-shape. Note that the bent extending portion 8*aa* is formed in the substantially U-shape by a bent portion 8*ac* and a bent portion 8*ad* at front and back left end portions of the bent extending portion 8*aa*.

The first restriction portion 8*a* configured as described above does not support the wire 6 only in the front-to-back direction for restricting relative deformation of the right-to-left extending portion 6*i* and the right-to-left extending portion 6*k* of the wire 6 in the front-to-back direction. That is, the plate portion 8*ab* of the first restriction portion 8*a* is not formed integrally only with front and back portions of the substantially U-shaped bent extending portion 8*aa*, but is also connected to the portion surrounded by the substantially U-shape to support the wire 6. As described above, the second restriction portion 8*b* supports the right-to-left extending portion 6*g*, the coupling portion 6*h*, and the right-to-left extending portion 6*i* of the wire 6, thereby tightly restricting deformation of the wire 6.

The second restriction portion 8*b* includes a front support portion 8*ba* covering and supporting the center of the right-to-left extending portion 6*i* in the right-to-left direction, a bent support portion 8*bb* covering and supporting the coupling portion 6*j*, a back support portion 8*bc* covering and supporting the center of the right-to-left extending portion 6*k* in the right-to-left direction, and a connection portion 8*c* connecting these portions. Specifically, the connection portion 8*c* includes a connection body 8*ca* extending in the right-to-left direction, a front connection portion 8*cb* at the front of the connection body 8*ca*, a middle connection portion 8*cc* at the right of the connection body 8*ca*, and a back connection portion 8*cd* at the back of the connection body 8*ca*.

The connection body 8*ca* is formed in a plate-like shape extending substantially horizontal, and front, back, and left edges of the connection body 8*ca* other than a portion connected to the middle connection portion 8*cc* are provided with ribs. The front connection portion 8*cb* is a portion connecting the connection body 8*ca* and the front support portion 8*ba*, and right and left edges of the front connection portion 8*cb* are provided with ribs. The middle connection portion 8*cc* is a portion connecting the connection body 8*ca* and the bent support portion 8*bb*, and front and back edges of the middle connection portion 8*cc* are provided with ribs. The back connection portion 8*cd* is a portion connecting the connection body 8*ca* and the back support portion 8*bc*, and right and left edges of the back connection portion 8*cd* are provided with ribs.

The second restriction portion 8*b* configured as described above does not support the wire 6 only by means of portions linearly arranged in the front-to-back direction for restricting relative deformation of the right-to-left extending portion 6*i* and the right-to-left extending portion 6*k* of the wire 6 in the front-to-back direction. That is, the second restriction portion 8*b* supports the wire 6 not only by the front connection portion 8*cb*, the connection body 8*ca*, the back connection portion 8*cd*, the front support portion 8*ba*, and the back support portion 8*bc* as the portions linearly arranged in the front-to-back direction, but also by the connection body 8*ca*, the middle connection portion 8*cc*, and the bent support portion 8*bb* arranged in the right-to-left direction. As described above, the second restriction portion 8*b* supports the right-to-left extending portion 6*i*, the coupling portion 6*j*, and the right-to-left extending portion 6*k* of the wire 6, thereby tightly restricting deformation of the wire 6.

The bridging portions 8*d*, 8*e* are formed to couple the first restriction portions 8*a* and the second restriction portions 8*b* formed integrally with the right and left three wires 6. Since the bridging portions 8*d*, 8*e* are formed as described above, an uneven deflection amount of the buffering body 5 in the right-to-left direction can be reduced.

Note that the first restriction portion 8*a* and the second restriction portion 8*b* of the front restriction member 8 as a portion forming the buffering body 5 have been described, but a plurality of first restriction portions 8*a* and a plurality of second restriction portions 8*b* can be provided at each of the three wires 6. Since the first restriction portions 8*a* and the second restriction portions 8*b* are provided as described above, the deflection amount of the buffering body 5 can be locally and finely adjusted.

Method for Adjusting Deflection Amount of Buffering Body 5 by Back Restriction Member 7

Figure 7A:
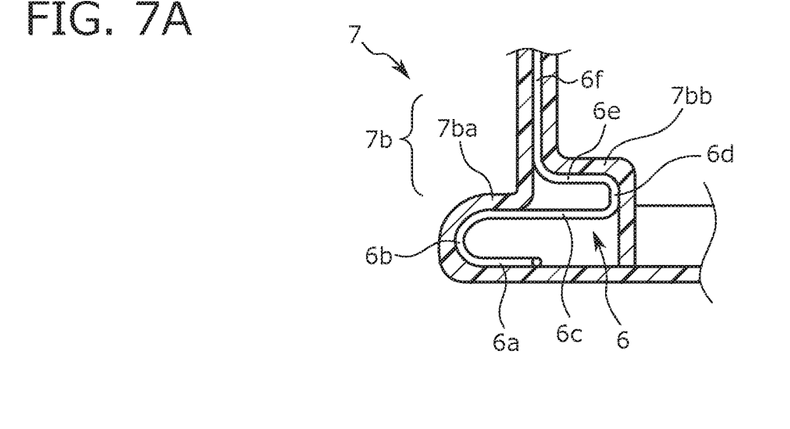
FIG. 7A is a diagram for describing the back restriction member and the wire in an initial state, according to an embodiment.
Figure 7B:
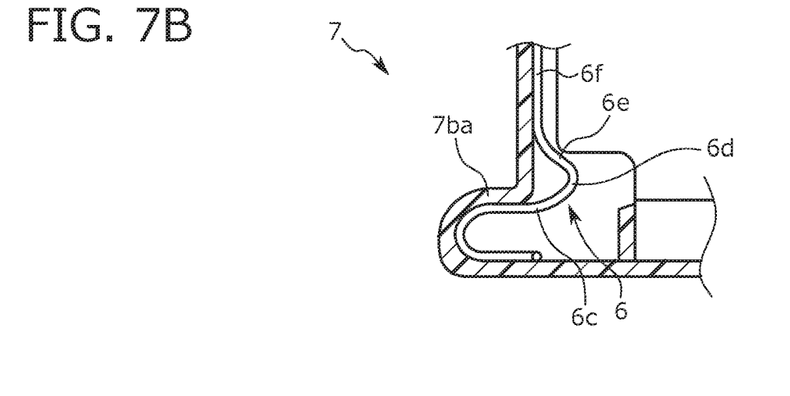
FIG. 7B is a diagram for describing the wire in a state in which an upper restriction portion is cut off and an occupant is on the vehicle seat, according to an embodiment.
Figure 7C:
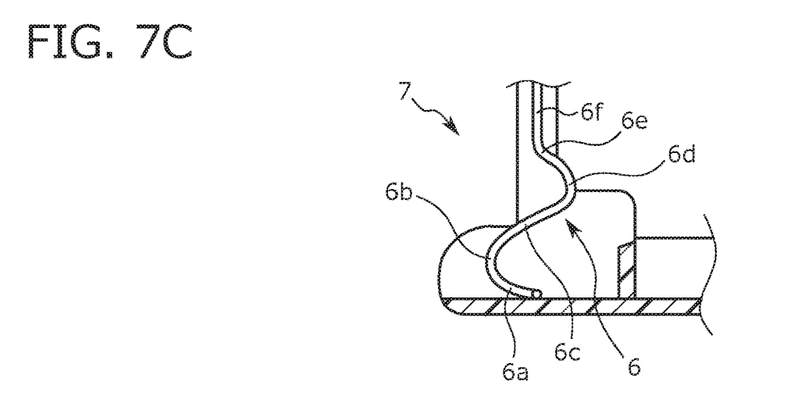
FIG. 7C is a diagram for describing the wire in a state in which a lower restriction portion is further cut off and the occupant is on the vehicle seat, according to an embodiment.

Adjustment for the deflection amount of the buffering body 5, more precisely, adjustment for increasing the deflection amount, is performed in such a manner that a portion of the back restriction member 7 or the front restriction member 8 is cut off (e.g., removed) to eliminate restriction on extension/contraction of the wire 6. First, the method for adjusting the deflection amount of the buffering body 5 by the back restriction member 7 is described with reference to FIGS. 7A to 7C. Note that FIG. 7A is a diagram for describing the back restriction member 7 and the wire 6 in an initial state. FIG. 7B is a diagram for describing the wire 6 in a state in which the upper restriction portion 7*bb* is cut off and the occupant is on the vehicle seat S. FIG. 7C is a diagram for describing the wire 6 in a state in which the lower restriction portion 7*ba* is further cut off and the occupant is on the vehicle seat S.

In the initial state illustrated in FIG. 7A, the lower restriction portion 7*ba* and the upper restriction portion 7*bb* forming the back restriction member 7 support the coupling portions 6*b*, 6*d*, respectively. Thus, the back restriction member 7 restricts deformation in the direction of opening the coupling portions 6*b*, 6*d* bent in the U-shape, i.e., extension in the substantially vertical direction. Thus, even in a state in which the occupant is seated on the vehicle seat S, deformation of a portion of the wire 6 covered with the back restriction member 7 is restricted by the back restriction member 7.

In the case of increasing the deflection amount of the buffering body 5 including the wires 6, an engineer cuts off the upper restriction portion 7*bb*, thereby eliminating restriction on deformation of the coupling portion 6*d* by the upper restriction portion 7*bb*. With this technique, when load is applied from the seated occupant to the vehicle seat S, a bent portion of the coupling portion 6*d* bent in the U-shape expands as illustrated in FIG. 7B, and therefore, the wire 6 extends in the upper-to-lower direction. That is, the upper-to-lower deflection amount of the buffering body 5 including the wires 6 increases. Moreover, in the present embodiment, the hook-side restriction portion 7*bc* has the cutout 10 with a substantially triangular opening as illustrated in FIG. 4. This cutout 10 is for more easily cutting off the upper restriction portion 7*bb*.

In the case of further increasing the deflection amount of the buffering body 5 from the state of FIG. 7B, the engineer cuts off the lower restriction portion 7*ba*, thereby eliminating restriction on deformation of the coupling portion 6*b* by the lower restriction portion 7*ba*. With this technique, when load is applied from the seated occupant to the vehicle seat S, a bent portion of the coupling portion 6*b* bent in the U-shape expands as illustrated in FIG. 7C, and therefore, the wire 6 extends in the upper-to-lower direction. That is, the upper-to-lower deflection amount of the buffering body 5 including the wires 6 increases.

As described above, the lower restriction portion 7*ba* or the upper restriction portion 7*bb* formed at the vertically-extending plate 7*b* extending in the substantially vertical direction is cut off so that the upper-to-lower deflection amount of the buffering body 5 can be adjusted. The back restriction member 7 supports and covers the right-to-left extending portion 6*a*, the right-to-left extending portion 6*c*, and the right-to-left extending portion 6*e* arranged at different heights. Thus, even if there is no space where the first restriction portion 8*a* or the second restriction portion 8*b* disposed substantially horizontal is provided, when there is a space where the back restriction member 7 can be provided, the deflection amount of the buffering body 5 can be adjusted.

The method of cutting off only the upper restriction portion 7*bb* and the method of cutting off the upper restriction portion 7*bb* and the lower restriction portion 7*ba* in this order have been described above as the method for adjusting the deflection amount of the buffering body 5 by cutting off of the back restriction member 7. However, the present disclosure is not limited to these implementations. For example, only the lower restriction portion 7*ba* may be cut off. Alternatively, the upper restriction portion 7*bb* and the lower restriction portion 7*ba* may be cut off in the order opposite to that described above, i.e., the upper restriction portion 7*bb* may be cut off after the lower restriction portion 7*ba* has been cut off.

Method for Adjusting Deflection Amount of Buffering Body 5 by Front Restriction Member 8

Figure 8A:
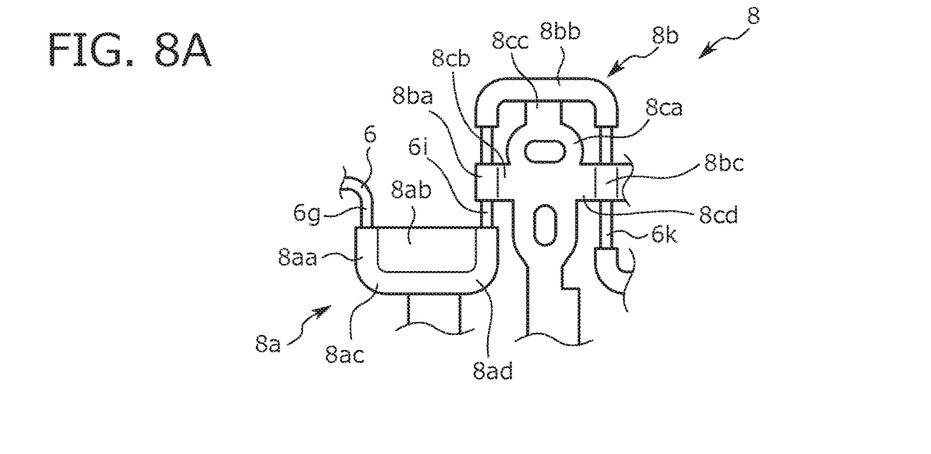
FIG. 8A is a diagram for describing the front restriction member and the wire in an initial state, according to an embodiment.
Figure 8B:
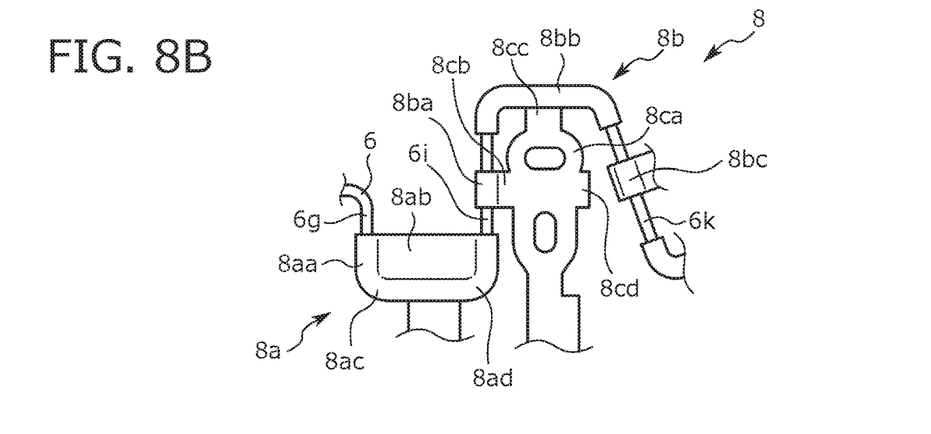
FIG. 8B is a diagram for describing the wire in a state in which a back connection portion is cut off and the occupant is on the vehicle seat, according to an embodiment.
Figure 8C:
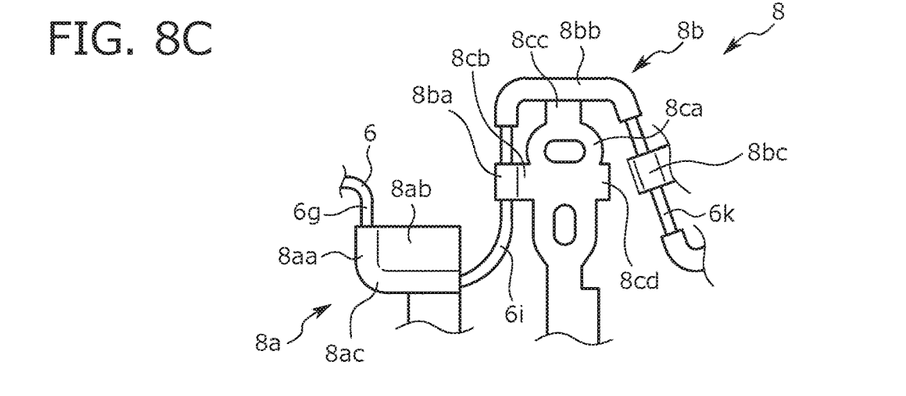
FIG. 8C is a diagram for describing the wire in a state in which a portion of a bent extending portion is cut off and the occupant is on the vehicle seat, according to an embodiment.

Next, the method for adjusting the deflection amount of the buffering body 5 by the front restriction member 8 is, in addition to FIG. 6, described with reference to FIGS. 8A to 8C. Note that FIG. 8A is a diagram for describing the front restriction member 8 in an initial state. FIG. 8B is a diagram for describing the wire 6 in a state in which the back connection portion 8*cd* is cut off and the occupant is on the vehicle seat S. FIG. 8C is a diagram for describing the wire 6 in a state in which a portion of the bent extending portion 8*aa* is cut off and the occupant is on the vehicle seat S.

In the initial state illustrated in FIGS. 6 and 8A, the first restriction portion 8*a* and the second restriction portion 8*b* forming the front restriction member 8 support the right-to-left extending portion 6*g*, the coupling portion 6*h*, the right-to-left extending portion 6*i*, the coupling portion 6*j*, and the right-to-left extending portion 6*k* of the wire 6. Thus, the front restriction member 8 restricts, by each of the first restriction portion 8*a* and the second restriction portion 8*b*, deformation in the direction of opening the coupling portions 6*h*, 6*j* bent in the U-shape, i.e., extension in the front-to-back direction. Thus, even in the state in which the occupant is seated on the vehicle seat S, deformation of a portion of the wire 6 covered with the front restriction member 8 is restricted by the front restriction member 8.

In the case of increasing the deflection amount of the buffering body 5 including the wires 6, the engineer cuts off the back connection portion 8*cd*, thereby separating the connection body 8*ca* and the back support portion 8*bc* from each other to eliminate restriction on deformation of the right-to-left extending portion 6*k* by the second restriction portion 8*b*. With this technique, when load is applied from the seated occupant to the vehicle seat S, the right-to-left extending portion 6*k* deforms to incline backward as illustrated in FIG. 8B, and therefore, the wire 6 extends in the front-to-back direction. That is, the front-to-back deflection amount of the buffering body 5 including the wires 6 increases.

The engineer may cut the front connection portion 8*cb*, thereby separating the connection body 8*ca* and the front support portion 8*ba* from each other to eliminate restriction on deformation of the right-to-left extending portion 6*i* by the second restriction portion 8*b*. Further, the engineer may cut both of the back connection portion 8*cd* and the front connection portion 8*cb*, thereby further increasing the deflection amount of the buffering body 5.

In the case of further increasing the deflection amount of the buffering body 5 from the state of FIG. 8B, the engineer cuts off a back end portion of the bent extending portion 8*aa* including the bent portion 8*ad*, as well as cutting off a back portion of the plate portion 8*ab* connected to the cut-off portion of the bent extending portion 8*aa*. In this manner, the engineer eliminates restriction on deformation of the coupling portion 6*h* by the first restriction portion 8*a*. With this technique, when load is applied from the seated occupant to the vehicle seat S, a bent portion of the coupling portion 6*h* bent in the U-shape expands as illustrated in FIG. 8C, and therefore, the wire 6 extends in the front-to-back direction. That is, the front-to-back deflection amount of the buffering body 5 including the wires 6 increases.

The engineer may cut off a front end portion of the bent extending portion 8*aa* including the bent portion 8*ac*, as well as cutting off a front portion of the plate portion 8*ab* connected to the cut-off portion of the bent extending portion 8*aa*. In this manner, the engineer may eliminate restriction on deformation of the coupling portion 6*h* by the first restriction portion 8*a*. Further, the engineer may cut both of the front and back end portions of the bent extending portion 8*aa*, thereby further increasing the deflection amount of the buffering body 5.

The method of cutting off only the back connection portion 8*cd* and the method of cutting off the back end portion of the bent extending portion 8*aa* after the back connection portion 8*cd* has been cut off have been described above as the method for adjusting the deflection amount of the buffering body 5 by separation and cutting off of a portion of the front restriction member 8. However, the present disclosure is not limited to these implementations. For example, only a portion of the bent extending portion 8*aa* may be cut off. Alternatively, a portion of the bent extending portion 8*aa* and the back connection portion 8*cd* may be cut off in the order opposite to that described above, i.e., the back connection portion 8*cd* may be cut after the portion of the bent extending portion 8*aa* has been cut off.

The example where the portion of the bent extending portion 8*aa* including the bent portion 8*ad* and the portion of the plate portion 8*ab* are cut off has been described, but the present disclosure is not limited to such an implementation. For example, the deflection amount of the buffering body 5 may be increased in such a manner that a bent portion of the bent support portion 8*bb* formed in a U-shape is cut off to largely open the coupling portion 6*j* formed in the U-shape.

Further, in the above-described embodiment, it has been described that the cutout 10 with the triangular opening is formed at the hook-side restriction portion 7bc so that the upper restriction portion 7bb can be easily cut off. The shape of the cutout 10 is optional, and cutouts may be similarly formed at other back restriction members 7 for restricting deformation of other wires 6 and cut-off or separated portions of the front restriction members 8.

By adjustment of the deflection amount of the buffering body 5 as described above, cushion properties of the seat cushion S1 can be adjusted. Alternatively, the buffering body 5 with a similar configuration may be disposed at the back frame S2a for adjustment of cushion properties of the seat back S2.

What is claimed is:

1. A conveyance seat comprising:
   a seat frame; and
   a buffering body bridged over the seat frame and configured to elastically support a seated occupant;
   wherein:
   the buffering body has a linear member having both end portions attached to the seat frame, and a restriction member configured to support at least a portion of the linear member to restrict deflection of the portion of the linear member;
   the linear member includes
     first and second extending portions that extend in a seat right-to-left direction, and
     a coupling portion coupling the first and second extending portions; and
   the restriction member is made of a resin material, and supports the first and second extending portions;
   the restriction member includes a plate-shaped horizontally-extending plate disposed substantially horizontal to extend in the seat right-to-left direction and a plate-shaped vertically-extending plate formed to stand upwardly from a back end portion of the horizontally-extending plate;
   the linear member is supported by the horizontally-extending plate and the vertically-extending plate; and
   the first and second extending portions are supported by the vertically-extending plate.

2. The conveyance seat according to claim 1, wherein the restriction member supports the first and second extending portions and the coupling portion.

3. The conveyance seat according to claim 1, wherein
   the linear member includes a plurality of first extending portions, a plurality of second extending portions, and a plurality of coupling portions, and
   the restriction member supports the first extending portions and the second extending portions.

4. The conveyance seat according to claim 3, wherein the restriction member supports the first extending portions, the second extending portions, and the coupling portions.

5. The conveyance seat according to claim 1, wherein the first and second extending portions are arranged at different heights relative to each other.

6. The conveyance seat according to claim 1, wherein
   the linear member includes a plurality of linear members arranged in parallel,
   the restriction member includes a plurality of restriction members configured to support some of the arranged linear members, and
   at least some of the restriction members are integrally formed.

7. The conveyance seat according to claim 1, wherein the restriction member has a cutout.

* * * * *